March 12, 1940.  C. E. JOHNSON  2,193,251
UNITARY VARIABLE-SPEED GEARED MOTOR STRUCTURE
Filed April 12, 1933  2 Sheets—Sheet 1
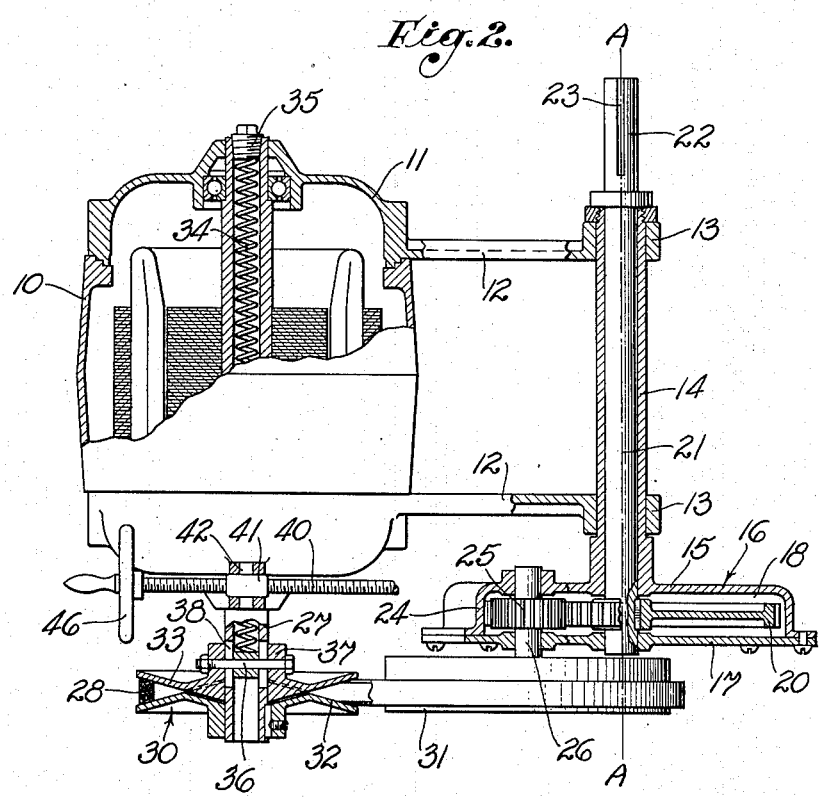
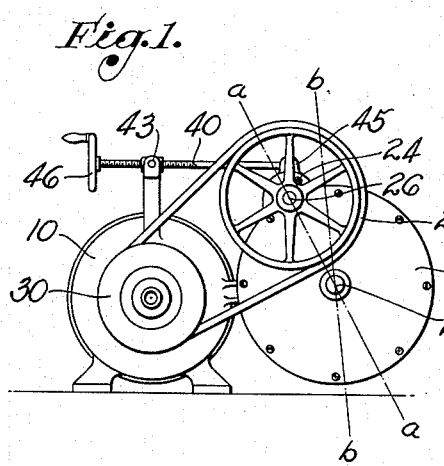
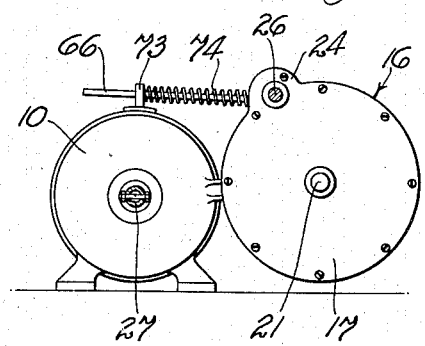
INVENTOR:
Carl E. Johnson,
BY Fred W Lamm
ATTORNEY.

March 12, 1940.  C. E. JOHNSON  2,193,251
UNITARY VARIABLE-SPEED GEARED MOTOR STRUCTURE
Filed April 12, 1933   2 Sheets-Sheet 2
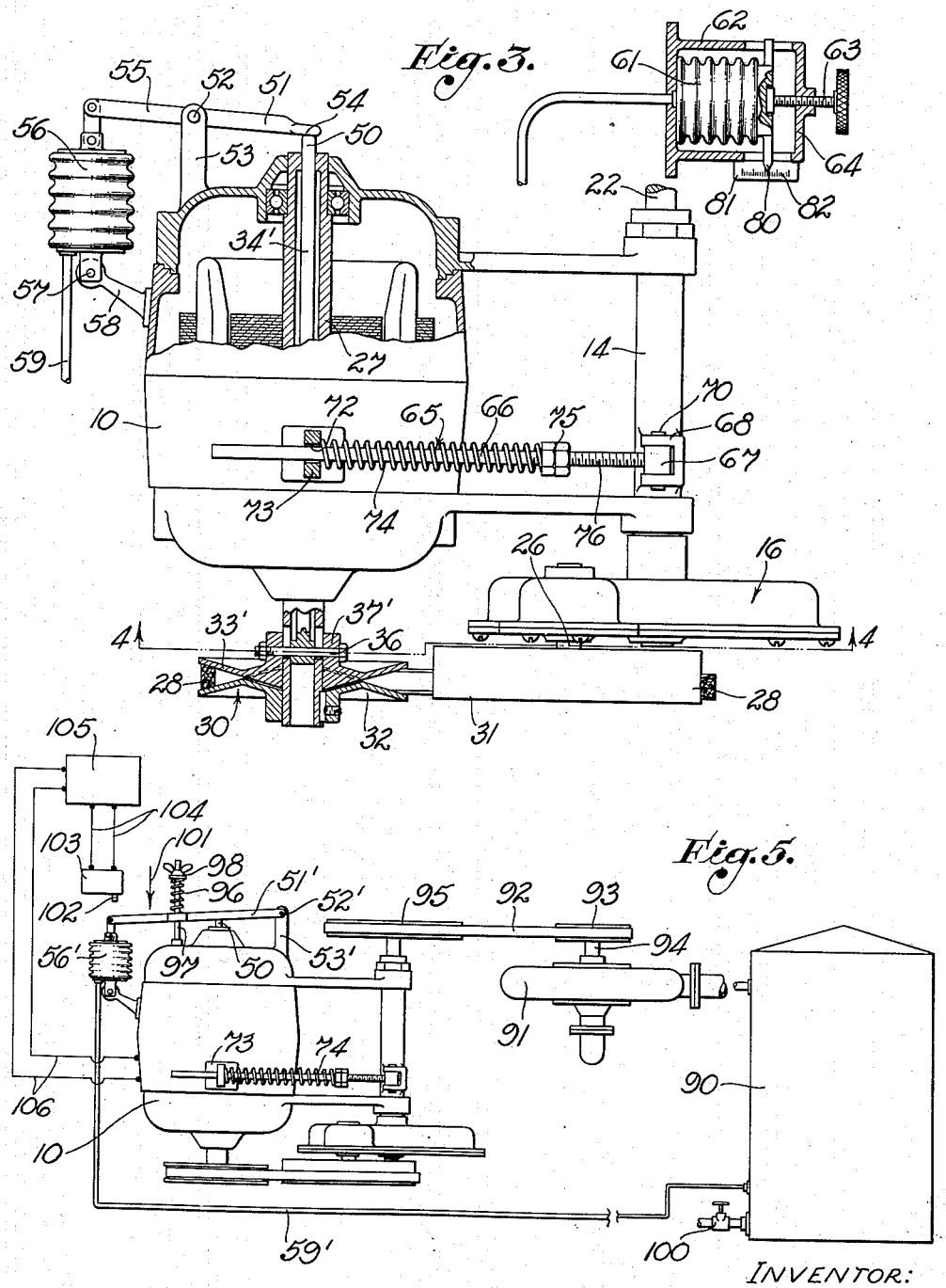
INVENTOR:
Carl E. Johnson,
By Fred W Lewis
ATTORNEY.

Patented Mar. 12, 1940

2,193,251

UNITED STATES PATENT OFFICE 2,193,251

UNITARY VARIABLE-SPEED GEARED MOTOR STRUCTURE

Carl E. Johnson, Pasadena, Calif., assignor to Sterling Electric Motors, Inc., Los Angeles, Calif., a corporation of California Application April 12, 1933, Serial No. 665,679

17 Claims. (Cl. 74—230.17)

My invention relates to a power unit of geared type in which a power delivery or power take-off shaft rotates at relatively slow speed as compared to the speed of rotation of the motor shaft, having means for varying the speed of the power delivery shaft within a reasonable range.

It is an object of the invention to provide a simple, compact, and sturdy structure embodying therein a simple form of speed varying mechanism, together with a reduction gear set whereby a relatively slow speed may be attained in the power delivery shaft. In its simplest form the invention consists of a motor having a base whereby it may be secured to a suitable foundation and having bracket arms extending from a side thereof. To these bracket arms a reduction gear unit is pivotally secured, this reduction gear unit having a power delivery shaft with a projecting end to which a pulley or gear may be secured to provide a power take-off, and having a power receiving shaft supported in a position eccentric to the axis of the power delivery shaft. This power receiving shaft is operatively aligned with the projecting end of the motor shaft and is adapted to be moved toward and away from the motor shaft by swinging the entire reduction gear unit which has a suitable arrangement of reduction gears connecting the power receiving shaft with the power delivery shaft. The motor shaft is connected to the power receiving shaft of the reduction gear unit by a variable-speed V-belt and pulley transmission, and means are provided for swinging or moving the reduction gear unit so as to move the power receiving shaft thereof relative to the motor shaft in accordance with the variations in the driving speed of the variable-speed transmission means connecting the motor shaft to the power receiving shaft of the reduction gear unit.

It is a further object of the invention to provide a reduction gear unit of variable-speed character having a remote control means of simple form for varying the speed of the power delivery shaft thereof, and it is a further object of the invention to provide such remote control means with an indicator which will show the speed at which the power delivery shaft is operating.

It is a further object of the invention to provide a simple form of variable-speed drive having means for varying the driving speed thereof in accordance with the demands or requirements of a driven device. The invention has utility with a wide variety of devices. For instance, where a quantity of fluid under pressure is maintained in a receiver or container and the fluid is being more or less regularly withdrawn from the receiver, the invention may be employed to operate a pressure pump for supplying the receiver at such speed that a constant pressure will be maintained in the receiver. In this use of the invention the variable-speed transmission of the invention is controlled directly by the pressure of fluid in the receiver; therefore, the speed at which the pressure pump is operated will vary in accordance with the rate at which fluid is withdrawn from the container, thereby avoiding the stopping and starting of the motor driving the pressure pump in accordance with the variation of the fluid pressure in the receiver between maximum and minimum limits, as is ordinarily done in devices of this character.

Further objects and advantages of the invention will be made evident throughout the following part of the specification.

Referring to the drawings, which are for illustrative purposes only,

Fig. 1 is a front elevation of a preferred form of my invention.

Fig. 2 is an enlarged, partly sectioned plan view corresponding to Fig. 1.

Fig. 3 is a plan view of a character similar to Fig. 2, showing an alternative form of my invention.

Fig. 4 is a sectional view to reduced scale taken on the line 4—4 of Fig. 3.

Fig. 5 is a plan view similar to Fig. 3, showing a variation in the practice of my invention.

In the form of my invention shown in Figs. 1 and 2, I provide a motor 10 having a supporting structure 11 for its various parts, which supporting structure, in accordance with standard practice, consists of a motor casing. Extending from the motor casing are bracket arms 12 having tubular walls 13 formed at the ends thereof so as to provide bearings for a tubular sleeve or extension 14 of a reduction gear case 15 forming a part of a reduction gear unit 16. The gear case 15 is provided with a cover plate 17, and within the recess 18 of the gear case 15 a gear 20 is mounted on a power delivery shaft 21 which has an end 22 projecting from the rearward end of the sleeve 14, to which a device to be driven may be connected. The end 22 is shown with a keyway 23 for use in securing a pulley or a gear on the end 22. In the upper part of the gear case 15 is a projecting wall 24 adapted to enclose a pinion 25 supported on the power receiving shaft 26 of the reduction gear unit 16. The power receiving shaft 26 is parallel with the shaft 21 of the motor 10 and is disposed so as to be in operative alignment therewith. A V-belt 28 runs over pulley means 30 and 31 carried respectively by the motor shaft 27 and the power receiving shaft 26, thereby providing means for transmitting power from the motor to the reduction gear unit 16. One of the pulley means, such as the pulley means 30, is of variable-diameter type and is of such character that the effective diameter thereof is varied in accordance with the change in the position of the belt 28, which change in the position of the belt is accomplished by moving the pulley means 31 relative to the pulley means 30.

As a part of my invention, the variable-diameter pulley means 30, which is preferably employed in conjunction with the motor shaft, has a conical flange 32 which is fixed on the outer end of the motor shaft 27 and a conical flange 33 which is axially slidable on the motor shaft but is splined thereto so as to be caused to rotate therewith. As clearly shown in Fig. 2, the motor shaft 27 is of hollow or tubular form and carries therein a compression spring 34, one end of which engages a plug 35 fitted into the rearward end of the shaft 27, and the other end of which engages a diametral pin or bar 36 which extends from a hub 37 formed on the flange 33 and through elongated slots 38 in the shaft 27. The spring 34 resiliently applies a pressure to the diametral bar 36 to force the flange 33 into close relation to the flange 32 so that when the pulley means 31 is in the position in which it is shown in Figs. 1 and 2, the belt 28 will ride between the peripheral portions of the flanges 32 and 33. By moving the power receiving shaft 26 in a rightward direction, the pulley means 31 may be correspondingly moved in rightward direction, with the result that the leftward portion of the belt 28 will be moved rightwardly or inwardly between the flanges 32 and 33, forcing the flange 33 rearwardly against the force of the spring 34. At this time the belt is in engagement with portions of the conical flanges 32 and 33 near the axis of rotation of the shaft 27, and the speed of travel of the belt is correspondingly reduced. Since the pulley means 31 is of constant diameter, the reduced speed of the belt 28 results in a reduction in the speed of rotation of the pulley means 31 and a consequent reduction in the speed of the power delivery shaft 21.

For the purpose of moving the power receiving shaft 26 relative to the motor shaft 27, I provide a screw 40 which threads through a nut 41 having a universal movement 42 within a bracket 43 secured to the top of the motor 10. The rightward end of the screw 40 engages a projection 45 carried on the upper part of the projecting wall structure 24 of the reduction gear unit 16. Rotation of the screw 40 by means of a suitable handle 46 produces a swinging movement or bodily rotation of the reduction gear unit on the axis A—A of the power delivery shaft 21. This swinging movement of the reduction gear unit 16 may be employed to swing the power receiving shaft 26 and the pulley means 31 to any desired position between the planes a—a and b—b. Accordingly, with the variable-speed transmission means, including the pulley means 30 and 31 and the V-belt 28, in the relative positions shown in Fig. 1, a relatively high speed is attained in the power delivery shaft 21. By operating the screw 40 so as to swing the reduction gear unit 16 in clockwise direction, the pulley means 31 may be moved rightwardly to draw the belt 28 inwardly between the conical flanges 32 and 33 of the variable-diameter pulley means 30, thereby reducing the effective diameter of the driving pulley means 30 and accomplishing a reduction in the speed of the power delivery shaft 21.

It will be perceived that the structure shown in Figs. 1 and 2 provides a complete variable-speed geared motor structure, having a power take-off or power delivery shaft capable of gradual variation of speed within prescribed limits. It is to be further noted that the adjustment of the parts necessary to accomplish variation of speed in the device does not change the position of the power delivery shaft relative to the motor 10 or to the supporting structure on which the entire power unit is carried.

In Figs. 1 and 2 I have shown a form of my invention employing a spring-type variable-diameter V-pulley. In Figs. 3 and 4 of the drawings I show a form of the invention in which I use a variable-diameter V-pulley which is mechanically adjusted to give the desired effective diameter, and in which form of the invention the change in the position of the V-belt due to the change in effective diameter of the adjustable pulley is compensated for by movement of the complementary non-adjustable pulley. In Figs. 3 and 4 many of the parts disclosed in Figs. 1 and 2 are duplicated, and for such parts duplicate numbers will be employed so as to avoid unnecessary repetition of descriptive matter. The motor 10 has a pulley means 30 thereon which consists of a fixed conical flange 32 and an axially slidable conical flange 33' equipped with a diametral pin or bar 36' extending through its boss 37'. In the second form of the invention the spring 34 shown in Fig. 1 is replaced by an actuating bar 34' which extends through the hollow shaft 27 of the motor 10 and has a projecting end 50 at the rearward end of the shaft 27 so that the bar 34' may be engaged and forced toward the diametral pin 36', whereby to move the axially movable flange 33' toward the fixed flange 32. For actuating the bar 34', I provide a lever 51 pivoted on a pin 52 carried by a rearwardly projecting bracket 53. The rightward end 54 of the lever 51 engages the rearward end 50 of the bar 34', and the leftward end 55 of the lever 51 is connected to a motivating means which, in the present form of the invention, consists of an expansible "Sylphon" bellows 56, which has its forward end pivotally connected by means of a pin 57 to a bracket 58 projecting from the motor 10. A feature of the second form of the invention is to provide a means for remotely controlling the speed of the power unit, and to this end I show a tube or pipe 59 extending to an actuating Sylphon bellows 61 mounted in a frame 62 and having a screw 63 engaging the movable end plate 64 thereof for the purpose of compressing the bellows 61 so as to force fluids therefrom through the pipe 59 to the bellows 56 to proportionately expand the bellows 56 and cause the lever 51 to swing in clockwise direction so as to force the bar 34' inwardly and to thereby move the flange 33' toward the fixed flange 32. It will be understood that the screw 63 may be suitably graduated to show proportionate speeds of the power delivery shaft 21, and that the actuating Sylphon 61 may be placed at any desired remote point convenient to operation by a workman.

In this second form of the invention, the screw 40 is replaced by a resilient means 65 for swinging the reduction gear unit 16 on the axis of the power delivery shaft 21 whereby to move the power receiving shaft 26 relative to the motor shaft 27. The swinging means 65 comprises a rod 66 having a head 67 pivotally secured to a lever 68 by means of a pin 70. The lever 68 is rigidly secured to, and extends upwardly from, the sleeve 14 of the reduction gear unit 16. The rod 66 extends through an opening 72 in a bracket 73 mounted on the motor 10, and a compression spring 74 is placed on the bar 66 in such position that the leftward end thereof will bear against the bracket 73 and the rightward end thereof will bear against adjusting lock nuts 75 which are held on a threaded portion 76 of the rod 66. The spring 74 tends to rotate the casing 15 of the reduction gear unit 16 in clockwise direction so as to move the power receiving shaft 26 and the driven pulley means 31 rightwardly or away from the variable-diameter pulley means 30. Accordingly, in this form of the invention the adjustment of the pulley means 30 controls the position of the V-belt 28 and the pulley means 31, the force of the spring 74 being such that the pulley means 31 will be always held in operative engagement with the V-belt 28. For example, with the parts in their relative positions shown in Fig. 3, the belt 28 is caused to ride between the peripheral portions of the flanges 32 and 33', thereby causing the pulley means 31 to be rotated at relatively high speed. Should it be desired to reduce the speed of rotation of the pulley means 31 and likewise of the power delivery shaft 21, the screw 63 is turned in such direction, as anti-clockwise direction, as to allow the "Sylphon" 61 to expand and permit fluid, such as oil, to flow from the Sylphon 56. The lever 51 may then swing through a controlled distance in anti-clockwise direction, permitting the bar 34' to move rearwardly or outwardly, with the result that the axially movable flange 33' is allowed to move rearwardly away from the fixed flange 32, thereby increasing the spacing between the conical faces of the flange. The pull of the pulley means 31 against the belt 28, due to the action of the spring 74, causes the belt 28 to move rightwardly or inwardly between the flanges 32 and 33' of the pulley means 30 as the space therebetween increases. The belt 28 then operates in the pulley means 30 at a position near the axis of rotation thereof, reducing the speed of travel of the belt 28 and consequently reducing the speed at which the reduction gear unit 16 is driven. To decrease the speed of operation of the power unit, the screw 63 is screwed inwardly so as to compress the Sylphon 61, this resulting in an expansion of the Sylphon 56 and a resultant movement of the axially movable flange 33' toward the fixed flange 32. As the flange 33' moves toward the flange 32, the belt 28 is forced to operate in a circle of enlarged diameter between the flanges 32 and 33', thereby increasing the speed of travel of the belt 28 so that the speed at which the reduction gear unit 16 is driven is accordingly increased. As the belt 28 moves leftwardly in response to the closing together of the flanges 32 and 33', the pulley means 31 is pulled leftwardly, and the reduction gear unit 16 is swung in counter-clockwise direction against the force of the spring 74. The adjusting lock nuts 75 may be adjusted so that the spring 74 will bear against the reduction gear unit 16 with a force sufficient to maintain a desired working tension in the belt 28.

A feature of the form of the invention shown in Figs. 3 and 4 resides in the provision of an indicator 80 which is secured to the movable end plate or head 64 of the Sylphon bellows 61 so as to be moved relative to a scale 81 having graduations 82 thereon for showing the speed of rotation of the power delivery shaft 21. In this form of the invention it is of course preferable to employ in the Sylphons 56 and 61 and the interconnecting piping 59 a relatively non-compressible fluid such as oil. Under such circumstances, the movement of the indicator 80 across the graduations 82 of the scale 81 will be representative of the various speeds attained by the adjustment of the mechanically or manually adjustable pulley means 30.

It is a further feature of the invention to provide a power unit having a speed varying means capable of automatic adjustment to suit existing needs or requirements of mechanisms, without employment of electrical controlling devices in the operation of the automatic speed varying mechanism. At the present time the speed of power devices or the speed of power transmission mechanisms is controlled in accordance with the temperature existing in a selected zone. Instead of using relatively delicate electrical thermostatic devices, with accompanying motors, rheostats, etc., my invention provides a direct means for controlling the variable-speed mechanism in accordance with variations in temperature. For example, the chamber represented by the Sylphon 61, the piping 59, and the Sylphon 56 may be filled with a fluid of high coefficient of expansion. As the volume of this fluid changes in accordance with the temperature changes, the Sylphon 56 will expand and contract, with the result that the movable part 33' of the adjustable pulley means 30 will be moved so as to provide variations in the velocity of the belt 28 proportionate to the temperature changes in the zone of the chamber represented by the Sylphon 61.

It will be perceived that the screw 63 represents a moving part adapted to actuate the "Sylphon" 61 and that such moving part 63 may be moved either manually or by the moving part of a machine which is being driven by the motor 10. Accordingly, it will be perceived that the Sylphon device 61 may be readily mounted on a driven machine in such position as to be actuated by a moving member, such as a lever, of such machine, thereby providing means for automatically varying the speed of the power delivery shaft 21 in accordance with the movement of the movable part of the driven machine, which movement may be representative of power requirements of the driven machine.

In Fig. 5 I diagrammatically show a receiver 90 adapted to receive fluid under pressure from a pump 91 operated by a belt 92 running over a pulley 93 on the pump shaft 94, and over a pulley 95 mounted on the power delivery shaft 21 of a variable-speed power unit constructed in accordance with the disclosure of Fig. 3, but having a Sylphon 56' so placed relative to a lever 51' that the axial bar 50 will move rearwardly proportionately to the rise in pressure in the container 90. In this form of the invention the lever 51' is pivoted at 52' on a bracket 53' situated diametrally opposite from the "Sylphon" 56', and a spring 96 is placed around a threaded bar 97 in a position to bear against the lever 51' and force such lever 51' inwardly against the expansive movement of the Sylphon 56'. A nut 98 is shown on the bar 97 for varying the compression of the spring 96.

The operation of the device shown in Fig. 5 is as follows. Let it be assumed that fluid is more or less continuously drawn from the container 90 through an outlet passage formed by piping 100. If the flow of this fluid is normally ten cubic feet per minute, the driving unit is selected and adjusted by proper use of pulleys so that when the adjustable V-belt pulley 30 is in its intermediate position, the pump 91 will deliver ten cubic feet of fluid per minute into the container 90; then, in the operation of the device should the withdrawal of fluid be increased to a quantity greater than ten cubic feet per minute, the pressure in the container 90 will recede. Since the position of the lever 51' is determined by the pressure in the container 90, this reduction in pressure will result in movement of the member 51' inwardly in the direction of the arrow 101, moving the bar 50 so as to increase the effective diameter of the adjustable pulley 30 and thereby increasing the speed of the power output shaft 21 and likewise increasing the speed of operation of the pump 91 so that a proportionate increase in the pumping of fluid into the container 90 will be attained. In a like manner, a cutting down in the quantity of fluid removed from the container 90 will result in an increase in pressure therein and a corresponding outward movement of the lever 51' so as to move the bar 50 in a direction to decrease the effective diameter of the V-pulley 30, thereby slowing down the speed at which the pump 91 is operated proportionate to the reduction in the rate of withdrawal of fluid from the container 90. Should the withdrawal of fluid from the container 90 be entirely discontinued, the fluid pressure therein will gradually increase to a maximum value, whereat the fluid pressure in the "Sylphon" 56' will cause the lever 51' to move against the force of the spring 96 into engagement with an actuating member 102 of a control switch 103 connected through conductors 104 with a motor switch 105 which controls and is connected with the motor 10 through the use of conductors 106, the actuation of the control or throw-out switch 103 resulting in the opening of the motor switch 105 and a consequent stopping of the motor 10.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A motor structure of the character described, including: a motor having a shaft and a supporting structure; a reduction gear unit movably secured to said supporting structure of said motor, said reduction gear unit having a power receiving shaft operatively aligned with said motor shaft, and a power delivery shaft for connection to a device to be driven; means for moving said reduction gear unit so as to move said power receiving shaft relative to said motor shaft; and a variable-speed drive connecting said motor shaft to said power receiving shaft, said drive varying the speed of rotation of said power receiving shaft in consequence of and proportionately to the change in the position of said power receiving shaft relative to said motor shaft.

2. A motor structure of the character described, including: a motor having a shaft and a supporting structure; a reduction gear unit pivotally mounted on said supporting structure of said motor, said reduction gear unit having a power receiving shaft operatively aligned with said motor shaft, and a power delivery shaft for connection to a device to be driven; means for rotating said reduction gear unit so as to move said power receiving shaft relative to said motor shaft; and a variable-speed drive connecting said motor shaft to said power receiving shaft, said drive varying the speed of rotation of said power receiving shaft in consequence of and proportionately to the change in the position of said power receiving shaft relative to said motor shaft.

3. A motor structure of the character described, including: a motor having a shaft and a supporting structure; a reduction gear unit pivotally mounted on said supporting structure of said motor so as to swing on an axis parallel to said motor shaft, said reduction gear unit having a power receiving shaft eccentric to said axis and operatively aligned with said motor shaft, and a power delivery shaft for connection to a device to be driven, said power delivery shaft being disposed on said axis; means for rotating said reduction gear unit so as to move said power receiving shaft relative to said motor shaft; and a variable-speed drive connecting said motor shaft to said power receiving shaft, said drive varying the speed of rotation of said power receiving shaft in consequence of and proportionately to the change in the position of said power receiving shaft relative to said motor shaft.

4. A motor structure of the character described, including: a motor having a shaft and a supporting structure; a reduction gear unit movably secured to said supporting structure of said motor, said reduction gear unit having a power receiving shaft operatively aligned with said motor shaft, and a power delivery shaft for connection to a device to be driven; means for moving said reduction gear unit so as to move said power receiving shaft relative to said motor shaft; and a variable-speed drive connecting said motor shaft to said power receiving shaft, said drive varying the speed of rotation of said power receiving shaft proportionately to the change in the position of said power receiving shaft relative to said motor shaft, said variable-speed drive including a V-belt and a pair of pulleys, at least one of which is of variable effective diameter and comprises a pair of conical plates with means for axially moving one of said plates.

5. A motor structure of the character described, including: a motor having a shaft and a supporting structure; a reduction gear unit pivotally mounted on said supporting structure of said motor so as to swing on an axis parallel to said motor shaft, said reduction gear unit having a power receiving shaft eccentric to said axis and operatively aligned with said motor shaft, and a power delivery shaft for connection to a device to be driven, said power delivery shaft being disposed on said axis; means for rotating said reduction gear unit so as to move said power receiving shaft relative to said motor shaft; and a variable-speed drive connecting said motor shaft to said power receiving shaft, said drive varying the speed of rotation of said power receiving shaft proportionately to the change in the position of said power receiving shaft relative to said motor shaft, said variable-speed drive including a V-belt and a pair of pulleys, at least one of which is of variable effective diameter and comprises a pair of conical plates with means for axially moving one of said plates.

6. A motor structure of the character described, including: a motor having a shaft and a supporting structure; a reduction gear unit movably secured to said supporting structure of said motor, said reduction gear unit having a power receiving shaft operatively aligned with said motor shaft, and a power delivery shaft for connection to a device to be driven; means for moving said reduction gear unit so as to move said power receiving shaft relative to said motor shaft; and a variable-speed drive connecting said motor shaft to said power receiving shaft, said drive varying the speed of rotation of said power receiving shaft proportionately to the change in the position of said power receiving shaft relative to said motor shaft, said variable-speed drive including a V-belt and a pair of pulleys, one of which is of variable effective diameter and comprises a pair of conical plates with means for resiliently forcing said conical plates relatively together, the separation of said pulleys in response to movement of said power receiving shaft causing said V-belt to be pulled inwardly between said conical plates.

7. A motor structure of the character described, including: a motor having a shaft and a supporting structure; a reduction gear unit pivotally mounted on said supporting structure of said motor so as to swing on an axis parallel to said motor shaft, said reduction gear unit having a power receiving shaft eccentric to said axis and operatively aligned with said motor shaft, and a power delivery shaft for connection to a device to be driven, said power delivery shaft being disposed on said axis; means for rotating said reduction gear unit so as to move said power receiving shaft relative to said motor shaft; and a variable-speed drive connecting said motor shaft to said power receiving shaft, said drive varying the speed of rotation of said power receiving shaft proportionately to the change in the position of said power receiving shaft relative to said motor shaft, said variable-speed drive including a V-belt and a pair of pulleys, one of which is of variable effective diameter and comprises a pair of conical plates with means for resiliently forcing said conical plates relatively together, the separation of said pulleys in response to movement of said power receiving shaft causing said V-belt to be pulled inwardly between said conical plates.

8. A motor structure of the character described, including: a motor having a shaft and a supporting structure; a power receiving shaft operatively aligned with said motor shaft; a swingable mounting for said power receiving shaft, said mounting being pivotally secured to said supporting structure on an axis eccentric to said power receiving shaft; a power delivery shaft rotative on said axis; gear means connecting said power receiving shaft with said power delivery shaft; a driven pulley on said power receiving shaft; a V-belt running on said pulley; a variable-diameter V-pulley on said motor shaft and receiving said V-belt; means for positively adjusting said variable-diameter pulley so as to change the diameter thereof; and yieldable means for swinging said swingable mounting so as to carry said driven pulley away from said variable-diameter pulley as said variable-diameter pulley is adjusted to a smaller effective diameter.

9. A motor structure of the character described, including: a motor having a shaft and a supporting structure; a power receiving shaft operatively aligned with said motor shaft; a swingable mounting for said power receiving shaft, said mounting being pivotally secured to said supporting structure on an axis eccentric to said power receiving shaft; a power delivery shaft rotative on said axis; gear means connecting said power receiving shaft with said power delivery shaft; a driven pulley on said power receiving shaft; a V-belt running on said pulley; a variable-diameter V-pulley on said motor shaft and receiving said V-belt; means, operative at a point remote from said motor, for positively adjusting said variable-diameter pulley so as to change the diameter thereof; and yieldable means for swinging said swingable mounting so as to carry said driven pulley away from said variable-diameter pulley as said variable-diameter pulley is adjusted to a smaller effective diameter.

10. A motor structure of the character described, including: a motor having a hollow shaft and a supporting structure; a power receiving shaft operatively aligned with said motor shaft; a swingable mounting for said power receiving shaft, said mounting being pivotally secured to said supporting structure on an axis eccentric to said power receiving shaft; a power delivery shaft rotative on said axis; gear means connecting said power receiving shaft with said power delivery shaft; a driven pulley on said power receiving shaft; a V-belt running on said pulley; a variable-diameter V-pulley on said motor shaft and receiving said V-belt; means for adjusting said variable-diameter pulley so as to change the diameter thereof, said adjusting means comprising a bar extending through said motor shaft and having one end thereof operatively connected to said variable-diameter pulley, and means adjacent the end of said motor shaft for actuating said bar in a manner to adjust said variable-diameter pulley; and yieldable means for swinging said swingable mounting so as to carry said driven pulley away from said variable-diameter pulley as said variable-diameter pulley is adjusted to a smaller effective diameter.

11. A motor structure of the character described, including: a motor having a hollow shaft and a supporting structure; a power receiving shaft operatively aligned with said motor shaft; a swingable mounting for said power receiving shaft, said mounting being pivotally secured to said supporting structure on an axis eccentric to said power receiving shaft; a power delivery shaft rotative on said axis; gear means connecting said power receiving shaft with said power delivery shaft; a driven pulley on said power receiving shaft; a V-belt running on said pulley; a variable-diameter V-pulley on said motor shaft and receiving said V-belt, said variable-diameter pulley including a stationary conical flange and a movable conical flange forming a variable V-slot therebetween; means for adjusting said variable-diameter pulley so as to change the diameter thereof, said adjusting means comprising a bar extending through said motor shaft and having one end thereof operatively connected to said movable flange, and means adjacent the end of said motor shaft for actuating said bar to move said movable flange relative to said stationary flange; and yieldable means for swinging said swingable mounting so as to carry said driven pulley away from said variable-diameter pulley as said variable-diameter pulley is adjusted to a smaller effective diameter.

12. A motor structure of the character described, including: a motor having a shaft and a supporting structure; a power receiving shaft operatively aligned with said motor shaft; a swingable mounting for said power receiving shaft, said mounting being pivotally secured to said supporting structure on an axis eccentric to said power receiving shaft; a power delivery shaft rotative on said axis; gear means connecting said power receiving shaft with said power delivery shaft; a driven pulley on said power receiving shaft; a V-belt running on said pulley; a variable-diameter V-pulley on said motor shaft and receiving said V-belt; means for positively adjusting said variable-diameter pulley so as to change the diameter thereof; and means for swinging said swingable mounting so as to carry said driven pulley away from said variable-diameter pulley as said variable-diameter pulley is adjusted to a smaller effective diameter.

13. A motor structure of the character described, including: a motor having a hollow shaft and a supporting structure; a power receiving shaft operatively aligned with said motor shaft; a swingable mounting for said power receiving shaft, said mounting being pivotally secured to said supporting structure on an axis eccentric to said power receiving shaft; a power delivery shaft rotative on said axis; gear means connecting said power receiving shaft with said power delivery shaft; a driven pulley on said power receiving shaft; a V-belt running on said pulley; a variable-diameter V-pulley on said motor shaft and receiving said V-belt; means for adjusting said variable-diameter pulley so as to change the diameter thereof, said adjusting means comprising a bar extending through said motor shaft and having one end thereof operatively connected to said variable-diameter pulley, and means adjacent the end of said motor shaft for actuating said bar in a manner to adjust said variable-diameter pulley; and means for swinging said swingable mounting so as to carry said driven pulley away from said variable-diameter pulley as said variable-diameter pulley is adjusted to a smaller effective diameter.

14. A motor structure of the character described, including: a motor having a hollow shaft and a supporting structure; a power receiving shaft operatively aligned with said motor shaft; a swingable mounting for said power receiving shaft, said mounting being pivotally secured to said supporting structure on an axis eccentric to said power receiving shaft; a power delivery shaft rotative on said axis; gear means connecting said power receiving shaft with said power delivery shaft; a driven pulley on said power receiving shaft; a V-belt running on said pulley; a variable-diameter V-pulley on said motor shaft and receiving said V-belt, said variable-diameter pulley including a stationary conical flange and a movable conical flange forming a variable V-slot therebetween; means for adjusting said variable-diameter pulley so as to change the diameter thereof, said adjusting means comprising a bar extending through said motor shaft and having one end thereof operatively connected to said movable flange, and means adjacent the end of said motor shaft for actuating said bar to move said movable flange relative to said stationary flange; and means for swinging said swingable mounting so as to carry said driven pulley away from said variable-diameter pulley as said variable-diameter pulley is adjusted to a smaller effective diameter.

15. In a motor structure of the character described, the combination of: a drive shaft adapted to be driven by a source of power; a power receiving shaft operatively aligned with said drive shaft; a power delivery shaft adapted to be connected to a device to be driven; means for operatively connecting said power receiving shaft and said power delivery shaft with a predetermined speed relation therebetween; a pair of pulleys, one of said pulleys being on said drive shaft and the other of said pulleys being on said power receiving shaft, one of said pulleys being of the variable-diameter V-type; a belt operatively connecting said pulleys so that said drive shaft is adapted to drive said power receiving shaft through said belt and said pulleys; and means for positively varying the diameter of said variable-diameter pulley so as to vary the speed relation between said drive shaft and said power receiving shaft.

16. In a motor structure of the character described, the combination of: a drive shaft adapted to be driven by a source of power; a power receiving shaft operatively aligned with said drive shaft; a power delivery shaft adapted to be connected to a device to be driven; means for operatively connecting said power receiving shaft and said power delivery shaft with a predetermined speed relation therebetween; a pair of pulleys, one of said pulleys being on said drive shaft and the other of said pulleys being on said power receiving shaft, one of said pulleys being of the variable-diameter V-type; a belt operatively connecting said pulleys so that said drive shaft is adapted to drive said power receiving shaft through said belt and said pulleys; means for positively varying the diameter of said variable-diameter pulley so as to vary the speed relation between said drive shaft and said power receiving shaft; and means for moving said power receiving shaft relative to said drive shaft to maintain a uniform tension in said belt as the diameter of said variable-diameter pulley is positively varied.

17. In a motor structure of the character described, the combination of: a drive shaft adapted to be driven by a source of power; a power receiving shaft operatively aligned with said drive shaft; a power delivery shaft adapted to be connected to a device to be driven; means for operatively connecting said power receiving shaft and said power delivery shaft with a predetermined speed relation therebetween; a pair of pulleys, one of said pulleys being on said drive shaft and the other of said pulleys being on said power receiving shaft, one of said pulleys being of the variable-diameter V-type; a belt operatively connecting said pulleys so that said drive shaft is adapted to drive said power receiving shaft through said belt and said pulleys; means for positively varying the diameter of said variable-diameter pulley so as to vary the speed relation between said drive shaft and said power receiving shaft without changing said predetermined speed relation between said power receiving shaft and said power delivery shaft; and means for moving said power receiving shaft relative to said drive shaft to maintain a uniform tension in said belt as the diameter of said variable-diameter pulley is positively varied.

CARL E. JOHNSON.